United States Patent
Long

(10) Patent No.: US 7,327,917 B2
(45) Date of Patent: Feb. 5, 2008

(54) DIRECTIONAL LIGHT BEAM GENERATORS

(75) Inventor: Xiangcun Long, Albuquerque, NM (US)

(73) Assignee: qXwave Inc., Albuquerque, NM (US)

( * ) Notice: Subject to any disclaimer, the term of this patent is extended or adjusted under 35 U.S.C. 154(b) by 50 days.

(21) Appl. No.: 11/307,248

(22) Filed: Jan. 28, 2006

(65) Prior Publication Data

US 2007/0177845 A1    Aug. 2, 2007

(51) Int. Cl.
*G02B 6/02* (2006.01)
*G02B 6/38* (2006.01)

(52) U.S. Cl. .............................. 385/43; 385/66; 385/68

(58) Field of Classification Search .................. 385/43, 385/66, 68
See application file for complete search history.

(56) References Cited

U.S. PATENT DOCUMENTS

| | | | | |
|---|---|---|---|---|
| 3,756,688 A * | 9/1973 | Hudson et al. | ................ | 385/43 |
| 3,832,028 A * | 8/1974 | Kapron | ......................... | 385/43 |
| 4,611,885 A * | 9/1986 | Boirat | ......................... | 385/22 |
| 4,795,228 A * | 1/1989 | Schneider | ..................... | 350/96 |
| 5,613,768 A | 3/1997 | Kim | | |
| 5,671,314 A * | 9/1997 | Gregory et al. | ............. | 385/128 |
| 5,907,650 A * | 5/1999 | Sherman et al. | ............... | 385/80 |
| 6,094,517 A * | 7/2000 | Yuuki | ........................... | 385/43 |
| 6,236,783 B1 * | 5/2001 | Mononobe et al. | ........... | 385/43 |
| 6,301,411 B1 * | 10/2001 | Yuuki | ........................... | 385/43 |
| 6,340,813 B1 * | 1/2002 | Tominaga et al. | ........... | 250/216 |
| 6,934,443 B2 * | 8/2005 | Hikichi et al. | ................. | 385/31 |
| 7,218,809 B2 * | 5/2007 | Zhou et al. | .................... | 385/28 |
| 2003/0044118 A1 * | 3/2003 | Zhou et al. | .................... | 385/43 |
| 2003/0081899 A1 * | 5/2003 | Hikichi et al. | ................. | 385/43 |
| 2003/0156813 A1 * | 8/2003 | Terakawa et al. | ............ | 385/129 |
| 2005/0117845 A1 * | 6/2005 | Hirose | ........................... | 385/39 |
| 2005/0204780 A1 * | 9/2005 | Moridaira et al. | ............. | 65/407 |
| 2006/0062521 A1 * | 3/2006 | Zhou et al. | .................... | 385/43 |

FOREIGN PATENT DOCUMENTS

JP          59088672 A   *   5/1984

* cited by examiner

*Primary Examiner*—K. Cyrus Kianni

(57) ABSTRACT

Directional light beam generators are implemented in waveguides with tilted core structures. The waveguides have cores, cladding and jacket layers. A directional light beam with small divergent beam angle is generated after propagating through the waveguides. Divergent light beams with large beam sizes can be converted into beams with small sizes.

21 Claims, 6 Drawing Sheets

DIRECTIONAL LIGHT BEAM GENERATORS

FIELD OF THE INVENTION

This invention relates to a method to generate a directional light beam with small divergent beam angle from light sources.

BACKGROUND OF THE INVENTION

A directional light beam with small divergent angle or a parallel light beam such as laser beam can theoretically maintain its original energy level indefinitely, no matter how far it travels from the source. Parallel beams also can be efficiently focused into a point with lens or mirrors. Therefore, a parallel light beam is desirable for use in many optical systems since it is easily manipulated by optical components such as lens or mirrors.

It is difficult to efficiently convert all of light into a parallel beam by using conventional optical components such as lens or mirrors when a light source has finite size and light beam emitted with finite angle range. Optical lens or mirrors can only partially convert light beam emitted from light source with finite size into a parallel beam when the light source is located at their focus points.

There are enormous efforts to obtain a parallel beam from light source with a finite size such as lamps. In U.S. Pat. No. 5,613,768, two arrayed mirrors were used to generate parallel light. Non-parallel lights from light source were blocked by plurality of holes. Thus, part of light energy was wasted and collection of lights is not efficient.

Present invention discloses a technique which can efficiently convert divergent light beams from light source with finite size into a directional light beam with small divergent angle or parallel light beam.

There are number of applications for the invented directional beam generator. The brightness of light can be greatly increased when the given light are coupled into smaller area from large area by employing invented directional beam generators; It can be used as a beam shaper for diode laser coupling to fiber with small core size; It can be used generate point light sources from lamps with finite size for projector; A white "laser"—a directional visible light beam can be generated using the invented directional beam generator.

SUMMARY OF THE INVENTION

According to the invention, a parallel beam or directional beam with smaller divergent angles can be obtained after divergent light passed through the invented devices. The divergent angle of incident light beam can be reduced to as small as diffraction-limited. The devices have fiber waveguides geometry with core, cladding layers and protect jacket. Cone structures with tilted surfaces between core and cladding layers are used to direct light into beam which possesses smaller propagation angle or even is parallel to the axis of devices. Lightwave with most of input energy and all of wavelength can be directed into a directional beam with small divergent angle or parallel beams.

BRIEF INTRODUCTION TO THE DRAWINGS

A better understanding of the invention will obtained by reference to the detailed description below, in conjunction with the following drawings, in which.

DETAILED DESCRIPTION OF THE INVENTION

Figure 1:
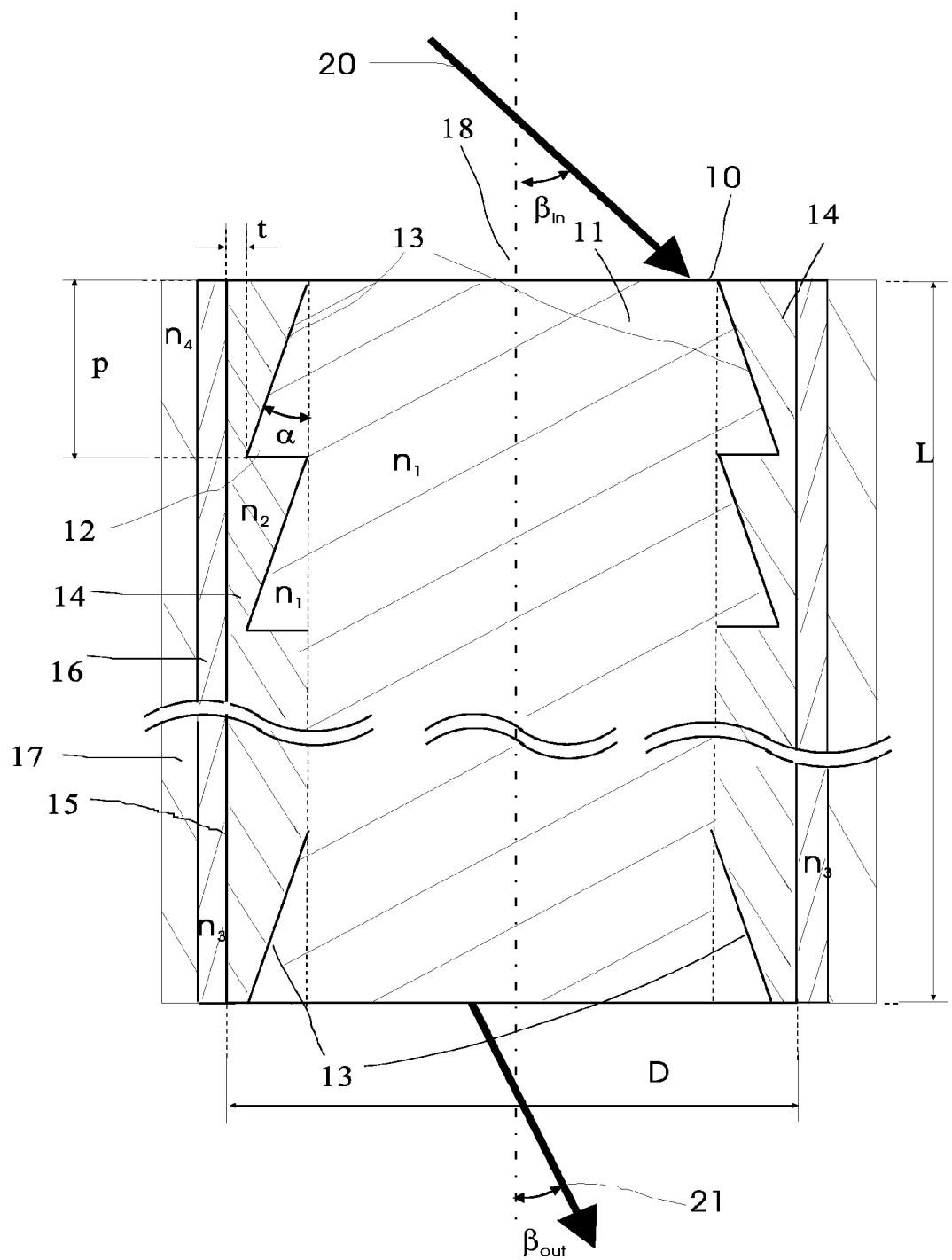
FIG. 1 shows cross-sectional side views of waveguide geometry with tilted wall surface.

In accordance with the invention, referring to FIG. 1, divergent lights were converted into light beams with smaller divergent angle or even parallel beam with waveguide structure 10. The waveguide structure typically is similar to optical fiber with round circle cross-section shape. However, its cross section can be other shapes such as rectangle, square and other polygons. It has first core 11, cone structure 12 with tilted surface 13, second core 14, cladding layer 16 and protect jacket 17. The materials for core, the cone structure and cladding layer are either transparent glasses or polymers or their combinations for the interested wavelength. The absorption loss of the medium materials should be low for the interested wavelength of light. The refractive index of first core with cone structure, second core, cladding and protect jacket materials are $n_1$, $n_2$, $n_3$, and $n_4$ respectively.

There are numbers of identical cone structures on the interface of core and cladding layer. The tilted angle of cone structure surface 13 is $\alpha$ relative to axis 18 of the waveguide. Its value can be either positive or negative. $\alpha$ is positive when the tilted surface is tilted toward the medium with lower index relative to axis of waveguides. $\alpha$ is negative when the tilted surface is tilted toward the medium with higher index. The pitch of cone structure, P, is ranged from wavelength level to whole device length. However, diffraction effect is negligible when the pitch of cones is much larger than the interested wavelength, $\lambda$, of incident light.

The distance from the outside surface of cladding layer to the edge of tilted surface, t, is ranged from on the order of wavelength of incident light to as large as core size waveguide, D. The range of t is given by $$\lambda \leq t \leq (D-2P \tan \alpha)/2$$

However, the diameter of waveguide structure, D, should be compatible to the size of light source or its image, which can be up to multi-centimeter level or even bigger, depending on applications. The whole length of devices is $$L \geq D/\tan \beta_{out}$$

The outside surface wall of the second core layer is parallel to the axis of the device.

A light beam 20 with maximum propagation angle, $\beta_{in}$, relative to axis 18 of devices is incident on waveguide 10. The lights are limited and propagated in the first 11 and second core 12 regions by total internal reflection on interface 15 of second core 12 and cladding layer 16. The refractive indexes $n_2$, $n_3$ of second core and cladding layer are given by $$n_3 = n_2 \cos \beta_{in}$$

For the output light beam 21 with maximum desired output propagation angle, $\beta_{out}$, the refractive indexes $n_1$, $n_2$ of first core and second core are given by $$n_2 = n_1 \cos(\beta_{out} - \alpha)$$

The lights will either be reflected by the tilted surface 13 or transmit through the interface of first core and second core. For the lights reflected the tilted surface 13 once, the propagation angle will be reduced by $$\Delta\beta_r = 2\alpha$$

For the lights transmitting through the first core 11 once, the propagation angle will be reduced by $$\Delta\beta_t \geq 2(n_1 - n_2)\alpha$$

After multi-reflections and transparent through the first core, all of lights will be converted into a beam with maximum propagation angle $\beta_{out}$, which can be as small as diffraction limited.

Figure 2:
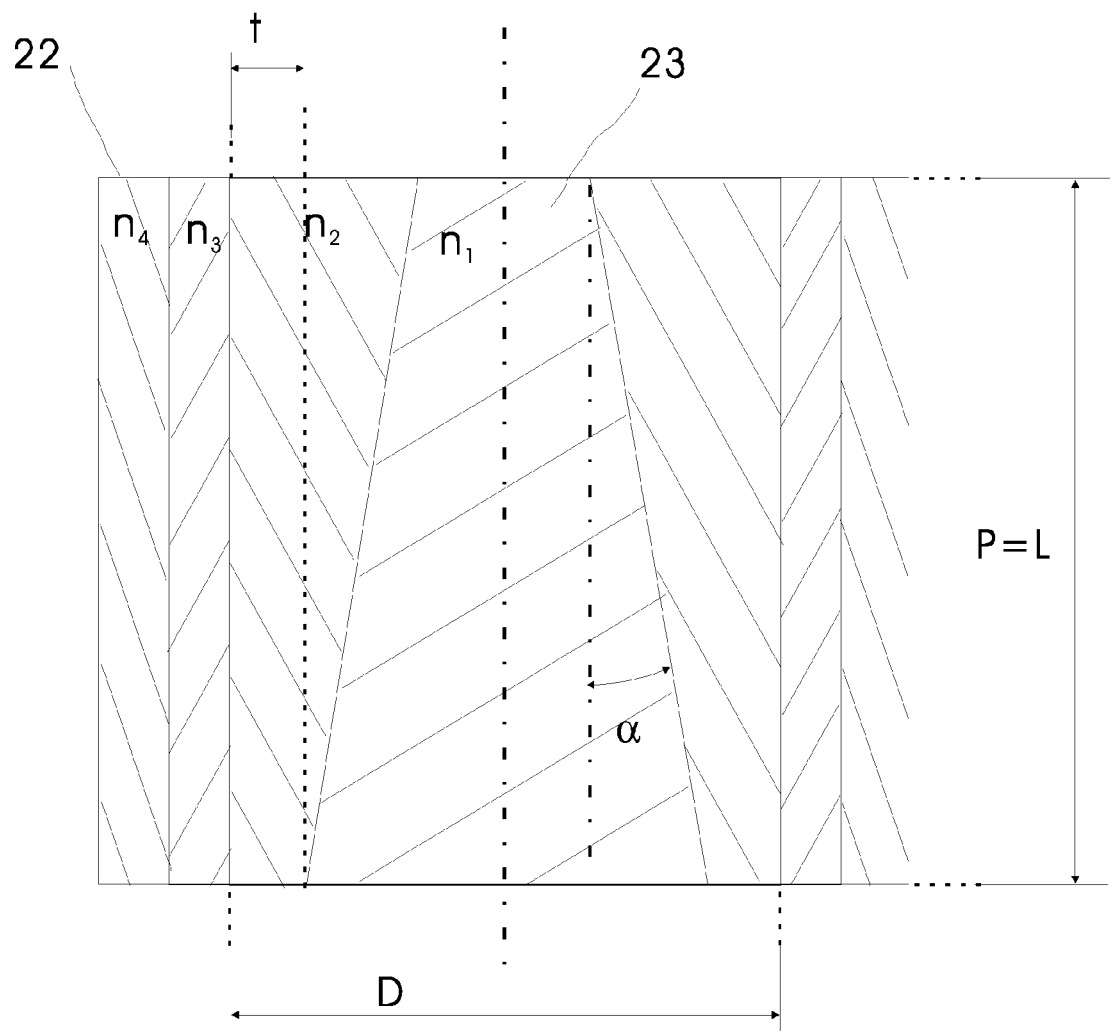
FIG. 2 shows cross-sectional side view of simplified waveguide geometry with tilted wall surface.

When the pitch of cone structure 12, P, is same as the length of devices, L, the device is simplified to the one 22 which has a cone structure 23 with index $n_1$, as shown in FIG. 2.

Figure 3A:
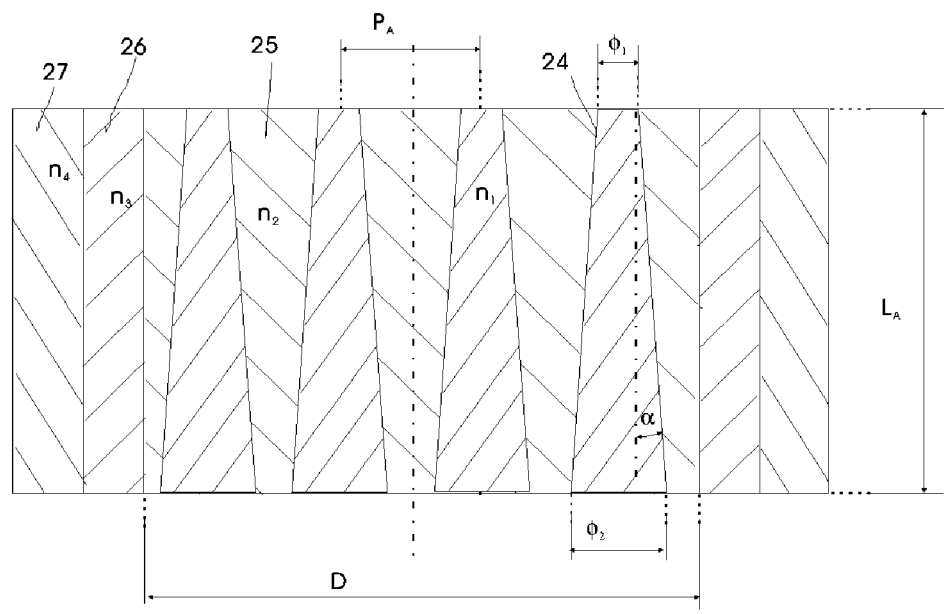
FIG. 3 shows cross-sectional side view of waveguide with array of cone core structure. 3a) side view; 3b) top view.
Figure 3B:
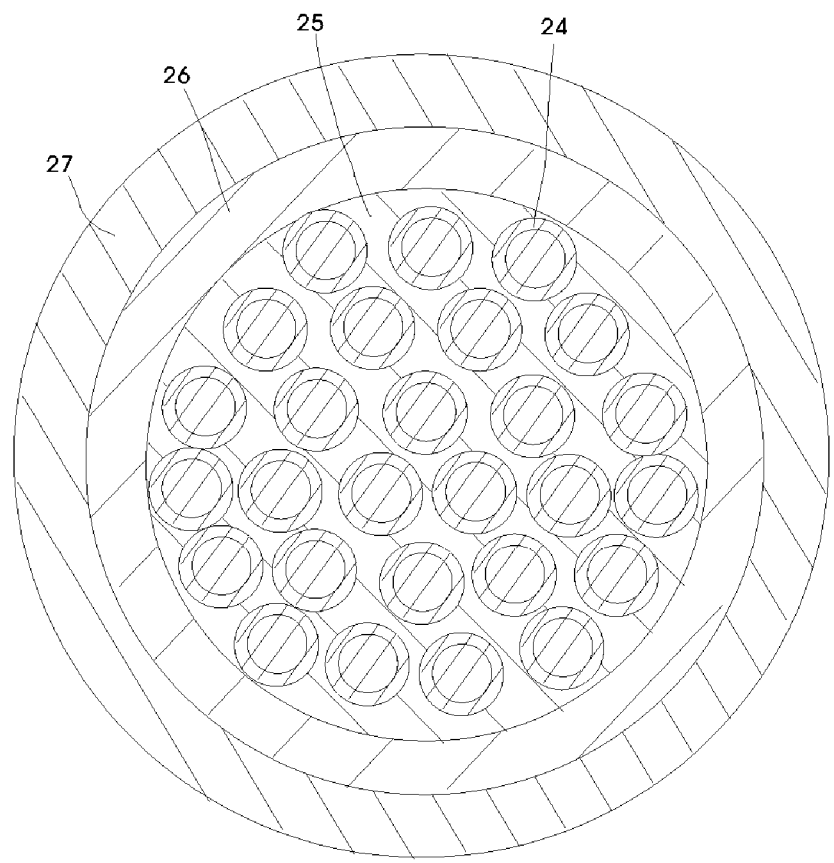

An array of cone structures can be located in core regions, as shown in FIG. 3. The cone 24 has start diameter $\phi_1$ and end diameter $\phi_2$ with tilted angle $\alpha$. The cones have refractive index $n_1$. The refractive indexes of second core 25, cladding 26 and jacket 27 are $n_2$, $n_3$, $n_4$, respectively. The cones can be arrayed as hexagonal, square or other patterns. The pitch of cones is $P_A$. The lights both transmitted through and reflected by the cone have reduced propagation angle in the same manners described above. Propagation angles of lights are continually decreased when lights propagate through or are reflected by following cones. The lights are guided in core regions by cladding layer 26. The devices length, $L_A$, should be large enough that all of lights will be converted into a beam with maximum propagation angle $\beta_{out}$. As a thumb of rules, the device length, $L_A$, is given by $$L_A \geq 0.1 N \ln NP_A / \tan \beta_{out}$$

$$N = (\beta_{in} - \beta_{out}) / k(n_1 - n_2)\alpha$$

where k is factor number related to parameters such as refractive indexes $n_1$, $n_2$, tilted angle $\alpha$, input propagation angle $\beta_{in}$ and output beam angle $\beta_{out}$.

Figure 4:
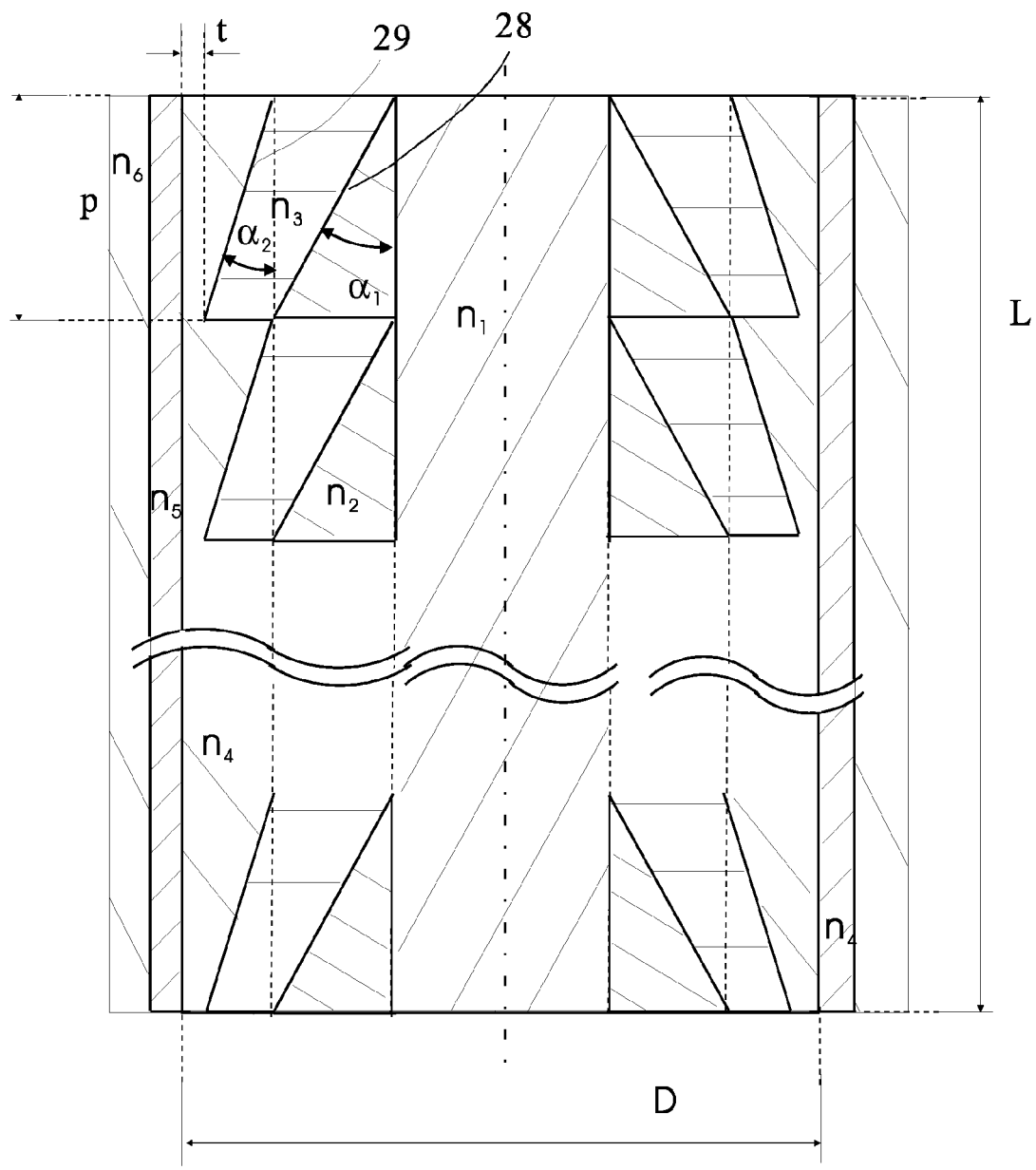
FIG. 4 shows cross-sectional side views of waveguide geometry with double cores with tilted wall surfaces.

Double or even more cone structure layers can be used to convert more energy of incident beam into beam with smaller divergent angle. The cross section structure of waveguide is shown in FIG. 4. This waveguide structure is fundamentally the same as one in FIG. 1 except double or even more cone structure 28 and 29 with tilted surfaces are used. These structures will provide more flexible design parameters. For the lights transmitting through the cores once, the propagation angle will be reduced by $$\Delta\beta_t \geq 2 \Sigma \Delta n_i \cdot \alpha_i$$

Other parameters such as refractive index of cores and cladding, device length can follow the way described above. After multi-reflections and transparent through the first core, all of lights will be converted into a beam with maximum propagation angle $\beta_{out}$, which can be as small as diffraction limited.

Figure 5:
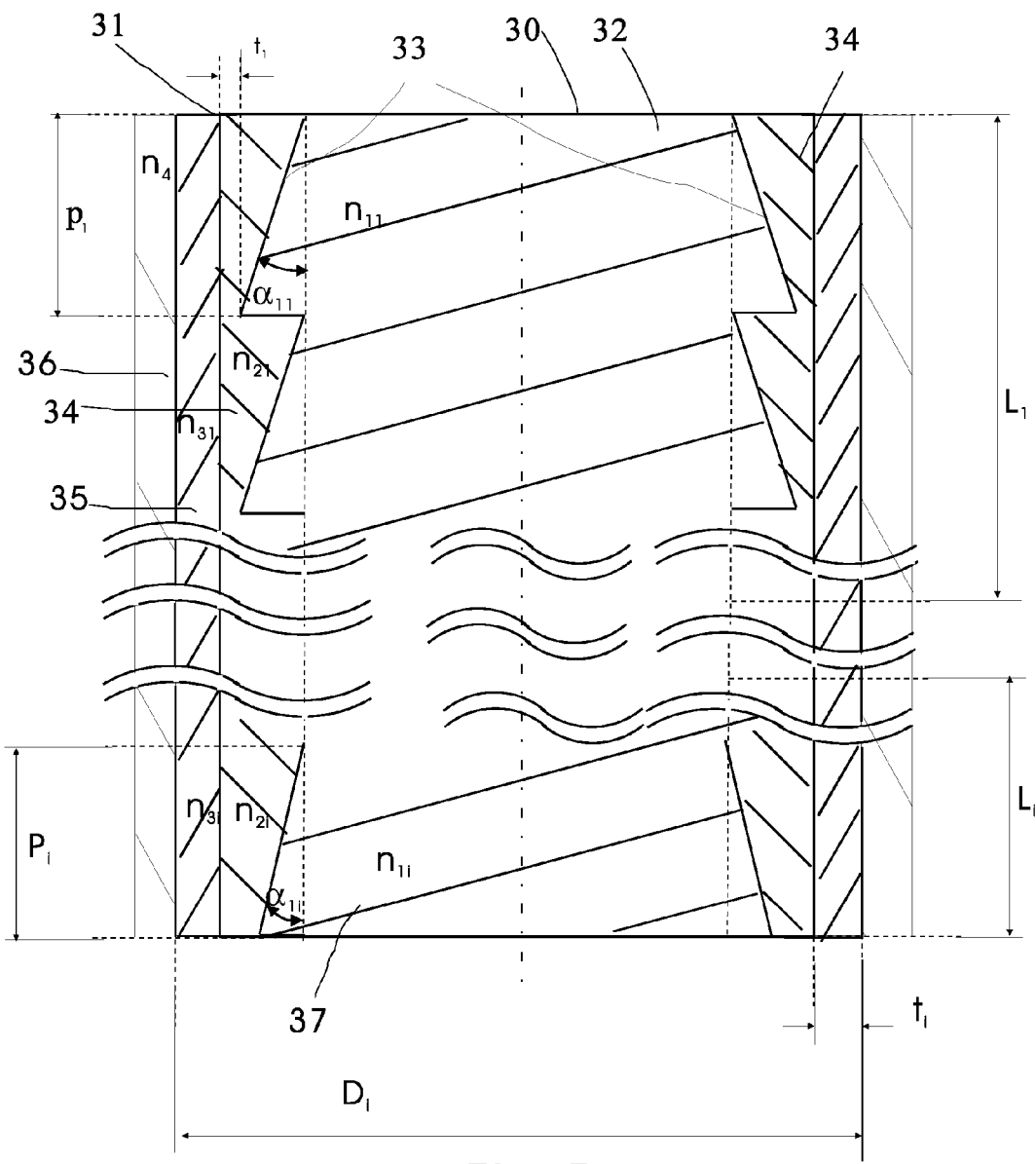
FIG. 5 shows cross-sectional side views of fiber waveguide geometry with multi-section of cone surface structure with varied tilted angels.

To more efficiently reduce the divergent angle of incident light beams, multi-section of waveguide structure as shown in FIG. 5 can be used. The waveguide 30 has i section of structure from first section 31 to ith section 37. Each section, for example section 31, has first core 32, cone structure 33, second core 34, cladding 35 and protect jacket 36, which is similar to the structure shown in FIG. 1. The refractive index of core, cone structure and cladding of ith section 35 are $n_{1i}$, $n_{2i}$ and $n_{3i}$, respectively. The refractive index of jacket is $n_4$. The tilted angle of cone structure is $\alpha_i$. The pitch of cone structure of ith section 35 is $p_i$. The maximum divergent angle of input beam for ith section is $\beta_{ini}$ and the divergent angle of output beam for ith section is $\beta_{outi}$. The refractive index of cores for ith section is given by $$n_{2i} = n_{1i} \cos(\beta_{outi} - \alpha_i)$$

The refractive index of cladding for ith section is given by $$n_{3i} = n_{2i} \cos \beta_{ini}$$

The length of ith section for the diameter of waveguides $D_i$ is given by $$L_i \geq D_i / \tan \beta_{outi}$$

The divergent angle of output beam, $\beta_{outi}$, corresponded to ith section is given by $$\beta_{outi} = \eta_i \beta_{ini}$$

where $\eta$ is referred as angle squeezed constant of devices, which is related to refractive index of medium, the titled angle.

The final divergent angle of light beam after the devices is given by $$\beta_{out} = \beta_{in} \eta_1 \eta_2 \ldots \eta_i$$

The divergent angle of output light beam can be as small as desired in the manner as described above after passing multi-sections of the invented devices. All of wavelength and most of input energy will be converted into the beam with small divergent angle.

Figure 6:
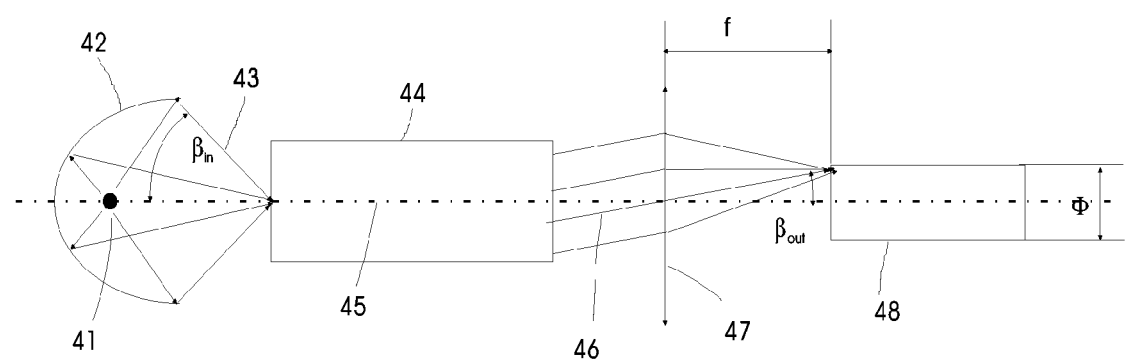
FIG. 6 shows a system setup to couple lights from a light source to a fiber with a small core.

As an example of applications, it is shown in FIG. 6 that lights from conventional light source lamp are coupled into a fiber with small core size. Lights from a conventional light source 41 are reflected on a elliptic mirror 42. Lights 43 are focused on invented directional beam generator 44 with incident angle $\beta_{in}$ related to axis 45 of the system. The divergent angle of output beam 46 from directional beam generator 44 was reduced to $\beta_{out}$, which is substantially smaller than the incident angle $\beta_{in}$. The output beam 46 is efficiently focused to a fiber 48 with small core diameter $\Phi$ by a lens 47. The focus length of the lens is f. The core diameter, $\Phi$, of the fiber is given by $$\Phi = 2f \tan \beta_{out}$$

What is claimed is:

1. A waveguide device reducing divergent angle of input beam from $\beta_{in}$ to $\beta_{out}$ with fiber waveguide geometry comprising:
a first core with cone structure with tilted angle $\alpha$; a second core surrounding said first core with said cone structure; a cladding surround second core with lower index than said second core materials and a protect jacket wherein cone arrays as said first core are located inside said second core with array pitch PA.

2. Fiber in claim 1, wherein said first core with said cone structure, said second core and cladding are comprised of transparent materials with low absorption losses for the interested wavelength including glasses or polymers or their combination with refractive index $n_1$, $n_2$, and $n_3$.

3. The refractive index of said first core and said second core in claim 1 for desired divergent angle $\beta_{out}$ of output beam with relationship of $n_2 = n_1 \cos(\beta_{out} - \alpha)$.

4. The refractive index of said second core and said cladding in claim 1 for said divergent angle $\beta_{in}$ of input beam with relationship of $n_3 = n_1 \cos \beta_{in}$.

5. The fiber in claim 1, wherein said divergent angle of output light beam from said fiber is reduced to $\beta_{out} = \eta \beta_{in}$ with $0 < \eta < 1$.

6. The fiber in claim 1, wherein the length of said fiber device is given by $L \geq D/\tan \beta_{out}$ with diameter D of said second core.

7. The fiber in claim 1, wherein said distance from the outside surface of said cladding layer to the edge of said tilted surface, t, is ranged by $\lambda \leq t \leq (D - 2P \tan \alpha)/2$.

8. The fiber in claim 1, wherein said propagation angle of lights reflected once on said tilted surface is reduced by $\Delta \beta_r = 2\alpha$.

9. The fiber in claim 1, wherein said propagation angle of lights transmitting once on said first core is reduced by $\Delta \beta_t \geq 2(n_1 - n_2)\alpha$.

10. The fiber in claim 1, wherein said cross section shape of said waveguide structure is circle, square, rectangle or other polygons.

11. The fiber in claim 1, wherein said first core has a cone structure with said tilted angle $\alpha$.

12. The fiber in claim 1, wherein the length of devices is given by $L_A = 0.1 P_A N \ln N / \tan \beta_{out}$.

13. The fiber in claim 1, wherein double or even more said cone core structures with titled surface are used.

14. The fiber in claim 1, wherein said propagation angle of lights transmitting once on said cores is reduced by $\Delta \beta_t \geq 2 \Sigma \Delta n_i \alpha_i$.

15. Said fiber in claim 1 comprising multi-sections waveguide structure, wherein said each section of waveguides has first core, second core with cone structure, cladding and protect jacket.

16. Multi-sections waveguide structure in claim 15, wherein said refractive index of said core and cladding for ith section waveguide with said desired divergent angle $\beta_{ini}$ of input beam are given by $n_{3i} = n_{2i} \cos \beta_{ini}$.

17. Multi-sections waveguide structure in claim 16, wherein said refractive index of said first core and said second core for ith section waveguide with said desired divergent angle $\beta_{ini}$ of output beam are given by $n_{2i} = n_{1i} \cos(\beta_{outi} - \alpha_i)$.

18. The fiber of claim 16, wherein said divergent angle of output light beam from said ith fiber section is $\beta_{outi} = \eta_i \beta_{ini}$ with $0 < \eta_i < 17$.

19. Multi-sections waveguide structure in claim 16, wherein said divergent angle of output beam from (i−1)th waveguide is said divergent angle of input beam to said ith waveguide section ($\beta_{out(i-1)} = \beta_{ini}$).

20. The fiber of claim 16, wherein the length of said fiber section is $L_i \geq D_i / \tan \beta_{outi}$ with diameter of said cladding $D_i$.

21. Multi-sections waveguide structure in claim 16, wherein said final divergent angle of output light beam is given by $\beta_{out} = \beta_{in} \eta_1 \cdot \eta_2 \cdots \eta_i$.

* * * * *